US008659635B2

(12) United States Patent
Ihara et al.

(10) Patent No.: US 8,659,635 B2
(45) Date of Patent: Feb. 25, 2014

(54) INFORMATION PROCESSING SYSTEM AND INFORMATION PROCESSING METHOD

(75) Inventors: Noboru Ihara, Tokyo (JP); Kazuhiro Sasao, Tokyo (JP); Masaru Yokoyama, Tokyo (JP); Arata Sakurai, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 13/511,936

(22) PCT Filed: Mar. 25, 2011

(86) PCT No.: PCT/JP2011/057456
§ 371 (c)(1),
(2), (4) Date: May 24, 2012

(87) PCT Pub. No.: WO2011/122496
PCT Pub. Date: Oct. 6, 2011

(65) Prior Publication Data
US 2013/0010052 A1 Jan. 10, 2013

(30) Foreign Application Priority Data
Mar. 31, 2010 (JP) .................. 2010-083022

(51) Int. Cl.
*H04N 7/14* (2006.01)
(52) U.S. Cl.
CPC ....................... *H04N 7/14* (2013.01)
USPC .................. 348/14.07; 348/14.08; 348/14.09
(58) Field of Classification Search
USPC .................... 348/14.01–14.16; 370/260–261; 709/204; 715/753, 201
See application file for complete search history.

(56) References Cited

U.S. PATENT DOCUMENTS

| 5,309,555 | A  | * | 5/1994  | Akins et al. ................... 715/756 |
| 5,444,476 | A  | * | 8/1995  | Conway ....................... 348/14.1 |
| 2004/0212629 | A1 | * | 10/2004 | Ohkawa ......................... 345/629 |
| 2005/0104864 | A1 |   | 5/2005  | Zhang et al. |
| 2008/0297436 | A1 |   | 12/2008 | Oikawa et al. |
| 2009/0061901 | A1 | * | 3/2009  | Arrasvuori et al. ......... 455/456.3 |
| 2009/0100350 | A1 | * | 4/2009  | Fuse et al. ..................... 715/753 |

FOREIGN PATENT DOCUMENTS

| JP | 2004-310470 A | 11/2004 |
| JP | 2006-202016 A | 8/2006 |
| JP | 2008-300983 A | 12/2008 |
| JP | 2009-194857 A | 8/2009 |
| JP | 2010-217719 A | 9/2010 |

OTHER PUBLICATIONS

V-Cube, "Nice to Meet You", Internet <http://ww.nice2meet.us>.

(Continued)

*Primary Examiner* — Melur Ramakrishnaiah
(74) *Attorney, Agent, or Firm* — Arent Fox LLP

(57) ABSTRACT

HMDs and compact cameras generate image data of display media of users, and transmit the data to a conference management server. HMDs and compact cameras further generate presentation information of the users for a conference, and transmit the information to the conference management server. The conference management server verifies the display medium by comparing an association between each user and the image data of the display medium used by the user with an association between the received image data of the display medium for the user and the user. If the verification is successful, the server transmits presentation information of the users for the conference received from the HMDs and the compact cameras to the HMDs.

22 Claims, 11 Drawing Sheets

(56) References Cited

OTHER PUBLICATIONS

Hitachi Software, "StarBoard", Internet <http://www.hitachijoho.com/solution/network/jp-tv/starboard.html>.

International Search Report dated Apr. 19, 2011 issued in corresponding International Application No. PCT/JP2011/057456.

Japanese Office Action dated Aug. 16, 2011 issued in corresponding Japanese Application No. 2010-083022.

European Application No. 11762727.3, Extended European Search Report dated Jul. 30, 2013.

Hirokazu Kato, et al., "Marker Tracking and HMD Calibration for a Video-based Augmented Reality Conferencing System", Augmented Reality, 1999. (IWAR '99). Proceedings. 2nd IEEE and ACM Int Emational Workshop on San Francisco, CA, Oct. 20, 1999, pp. 85-94.

Jia Mo et al., "Digit-writing hand Gesture Recognition by Hand-Held Camera Motion Analysis", Signal Processing and Communication Systems, Sep. 28, 2009, pp. 1-5.

M Billinghurst et al., "Out and about—real World Teleconferencing", BT Technology Journal, Jan. 1, 2000, pp. 80-82, vol. 18, No. 1, Springer, Dordrecht, NL.

\* cited by examiner

F I G. 7A
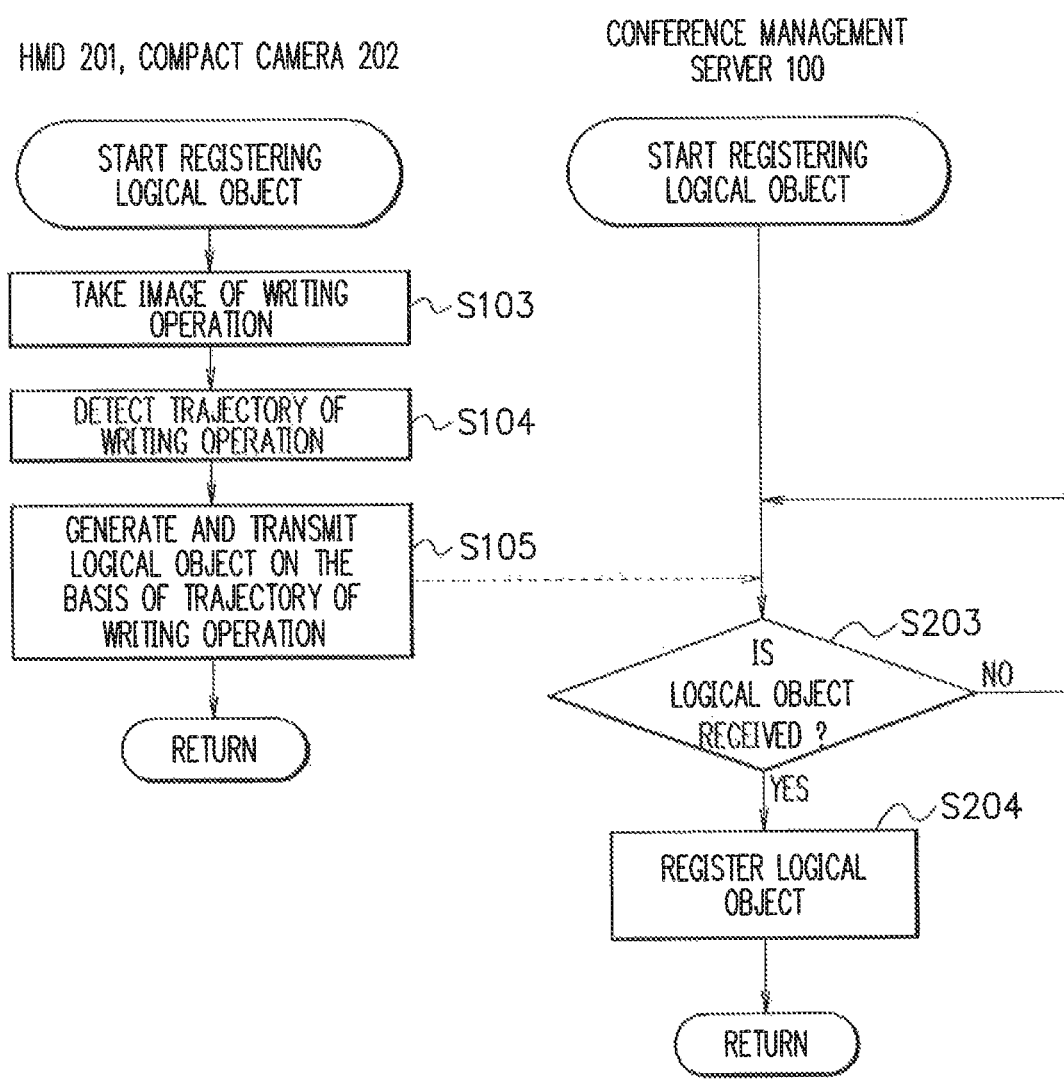

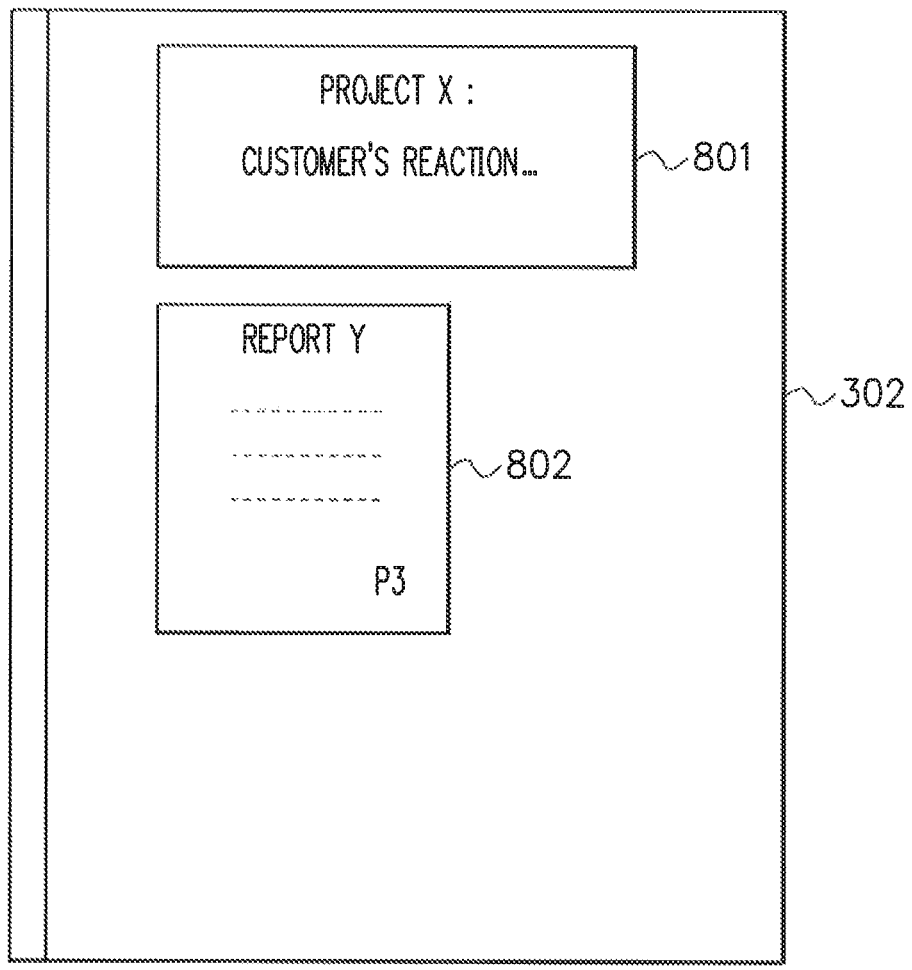

F I G. 10
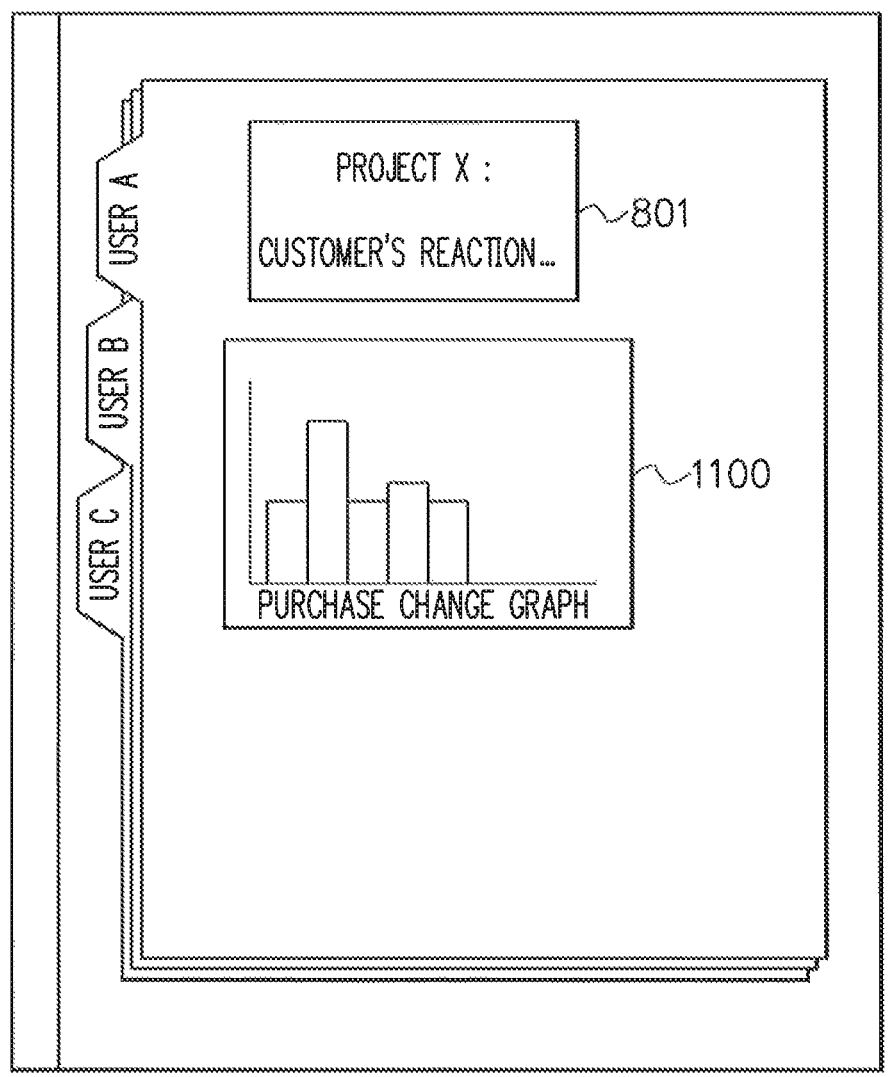

INFORMATION PROCESSING SYSTEM AND INFORMATION PROCESSING METHOD

TECHNICAL FIELD

The present invention relates to augmented reality (hereinafter referred to as AR), which allows an image in real space and computer graphics image data to be combined with each other and displayed in a superimposed manner. The AR refers to a technique that displays data, such as characters, diagrams, still images and moving images, managed by a computer (hereinafter referred to as computer graphics image data) on a real environment in a superimposed manner and that provides supplemental information.

BACKGROUND ART

Techniques related to conference support software, such as a television (TV) conference system and a web conference system, are known, in which participants at remote locations share information (see, e.g., Non Patent Literature 1). With use of the TV conference system, conference participants at remote locations can experience a conference in a face-to-face manner. This system allows the conference to occur in a face-to-face manner as if it were occurring in one room (e.g., a conference room). The web conference system allows documents to be shared and enhances understanding between the remote locations, thereby facilitating the conference. Further, a web conference system using a white board is known (see e.g., Non Patent Literature 2). This system is a conference support system that displays information written on a white board using an electronic stylus. The information is displayed on a white board at a remote location.

CITATION LIST

Non Patent Literature

Non Patent Literature 1: V-cube "Nice to meet you," Internet <http://www.nice2meet.us>
Non Patent Literature 2: Hitachi Software "StarBoard," Internet <http://www.hitachijoho.com/solution/network/jp-tv/starboard.html>

SUMMARY OF INVENTION

In these conventional techniques, the participants at remote locations can share information. However, the environment is fixed. This imposes constraints due to environments, such as Participant A being bound by a TV conference system (x) located at place A and Participant B being bound by a TV conference system (y) located at a place B. Accordingly, the techniques cannot realize a situation where the participants have a conference as if they were in the same room irrespective their locations.

It is thus an object of the present invention to provide support for a conference without the environmental constraints of the locations at which the participants are physically attending a conference, even if the participants are at physically different locations.

Solution to Problem

A first aspect of an information processing system of the present invention is an information processing system including a plurality of augmented reality presentation apparatuses having a transmissive display, and a conference management apparatus that is connected to the plurality of augmented reality presentation apparatuses via a network and transmits and receives computer graphics image data, the plurality of augmented reality presentation apparatuses including: an imaging unit for taking an image of a real space with which the computer graphics image data is displayed in a superimposed manner on the transmissive display, a display medium image data generation unit for transmitting image data of the display medium of the user using each augmented reality presentation apparatus that has been taken by the imaging unit, to the conference management apparatus, and a generation unit for generating presentation information for a conference of the user using each augmented reality presentation apparatus, and transmitting the information to the conference management apparatus, the conference management apparatus including: a display medium management unit for receiving the image data of the display medium from the plurality of augmented reality presentation apparatuses, associating the image data of the display medium with the user of the display medium, and registering the associated data in a recording medium, a management unit for receiving the presentation information from the plurality of augmented reality presentation apparatuses, and a transmission unit for transmitting the presentation information received by the management unit, to each of the plurality of augmented reality presentation apparatuses that are connected to the conference management apparatus and used in the conference attended by the users registered in association with the image data of the display medium display medium management unit, and each augmented reality presentation apparatus displays the computer graphics image data indicating the presentation information received from the conference management apparatus on the transmissive display in a superimposed manner so as to conform to the real space.

A second aspect of an information processing system of the present invention is an information processing system having a plurality of augmented reality presentation apparatuses including a non-transmissive display, and a conference management apparatus that is connected to the plurality of augmented reality presentation apparatuses via a network and transmits and receives computer graphics image data, the plurality of augmented reality presentation apparatuses including: an imaging unit for taking an image of a real space with which the computer graphics image data is displayed in a superimposed manner on the non-transmissive display, a display medium image data generation unit for transmitting image data of the display medium of the user using each augmented reality presentation apparatus that has been taken by the imaging unit, to the conference management apparatus, and a generation unit for generating presentation information for a conference of the user using each augmented reality presentation apparatus, and transmitting the information to the conference management apparatus, the conference management apparatus including: a display medium management unit for receiving the image data of the display medium from the plurality of augmented reality presentation apparatuses, associating the image data of the display medium with the user of the display medium, and registering the associated data in a recording medium, management unit for receiving the presentation information from the plurality of augmented reality presentation apparatuses, and a transmission unit for transmitting the presentation information received by the management unit, to each of the plurality of augmented reality presentation apparatuses that are connected to the conference management apparatus and used in the conference attended by the users registered in association with the image data of the display medium by the display medium management unit, and each augmented reality presentation apparatus displays the computer graphics image data indicating the presentation information received from the conference management apparatus on the non-transmissive display in a superimposed manner so as to conform to the image of the real space taken by the imaging unit.

A first aspect of an information processing method of the present invention is an information processing method executed by an information processing system including a plurality of augmented reality presentation apparatuses having a transmissive display, and a conference management apparatus that is connected to the plurality of augmented reality presentation apparatuses via a network and transmits and receives computer graphics image data, the method including: taking an image of a real space with which the computer graphics image data is displayed in a superimposed manner, on the transmissive display, transmitting image data of the display medium of the user using each augmented reality presentation apparatus that has been taken by the imaging unit, to the conference management apparatus, generating presentation information of the user for a conference of the user using each augmented reality presentation apparatus, transmitting the information to the conference management apparatus, the conference management apparatus including: receiving the image data of the display medium from the plurality of augmented reality presentation apparatuses, associating the image data of the display medium with the user of the display medium, registering the associated data in a recording medium, receiving the presentation information from the plurality of augmented reality presentation apparatuses, and transmitting the received presentation information received to all the plurality of augmented reality presentation apparatuses, that are connected to the conference management apparatus and used in the conference attended by the users registered in association with the image data of the display medium, wherein each augmented reality presentation apparatus displays the computer graphics image data indicating the presentation information received from the conference management apparatus on the transmissive display in a superimposed manner so as to conform to the real space.

A second aspect of an information processing method of the present invention is an information processing method executed by an information processing system including a plurality of augmented reality presentation apparatuses having a nontransmissive display and a conference management apparatus that is connected to the plurality of augmented reality presentation apparatuses via a network and transmits and receives computer graphics image data, the method including: taking an image of a real space with which the computer graphics image data is displayed in a superimposed manner on the non-transmissive display, transmitting image data of the display medium of the user using each augmented reality presentation apparatus that has been taken by the imaging unit, to the conference management apparatus, generating presentation information for a conference of the user using each augmented reality presentation apparatus, transmitting the information to the conference management apparatus, receiving the image data of the display medium from the plurality of augmented reality presentation apparatuses, associating the image data of the display medium with the user of the display medium, registering the associated data in a recording medium, receiving the presentation information from the plurality of augmented reality presentation apparatuses, and transmitting the received presentation information the to all the plurality of augmented reality presentation apparatuses that are connected to the conference management apparatus and used in the conference attended by the users registered in association with the image data of the display medium, wherein each augmented reality presentation apparatus displays the computer graphics image data indicating the presentation information received from the conference management apparatus on the non-transmissive display in a superimposed manner so as to conform to the image of the real space taken by the imaging unit.

The present invention can provide support for a smooth conference without the environmental constraints of the physical locations where participants are attending a conference, even if the participants are at physically different locations.

BRIEF DESCRIPTION OF DRAWINGS

FIG. 7A is a flowchart showing a process of registering a logical object in the conference management system according to the embodiment of the present invention.

FIG. 8B is a diagram showing an example of AR display of logical objects on the display medium.

FIG. 10 is a diagram showing an example of AR display of logical objects on the display medium.

DESCRIPTION OF EMBODIMENTS

Preferred embodiments to which the present invention is applied will hereinafter be described with reference to the accompanying drawings.

Figure 1:
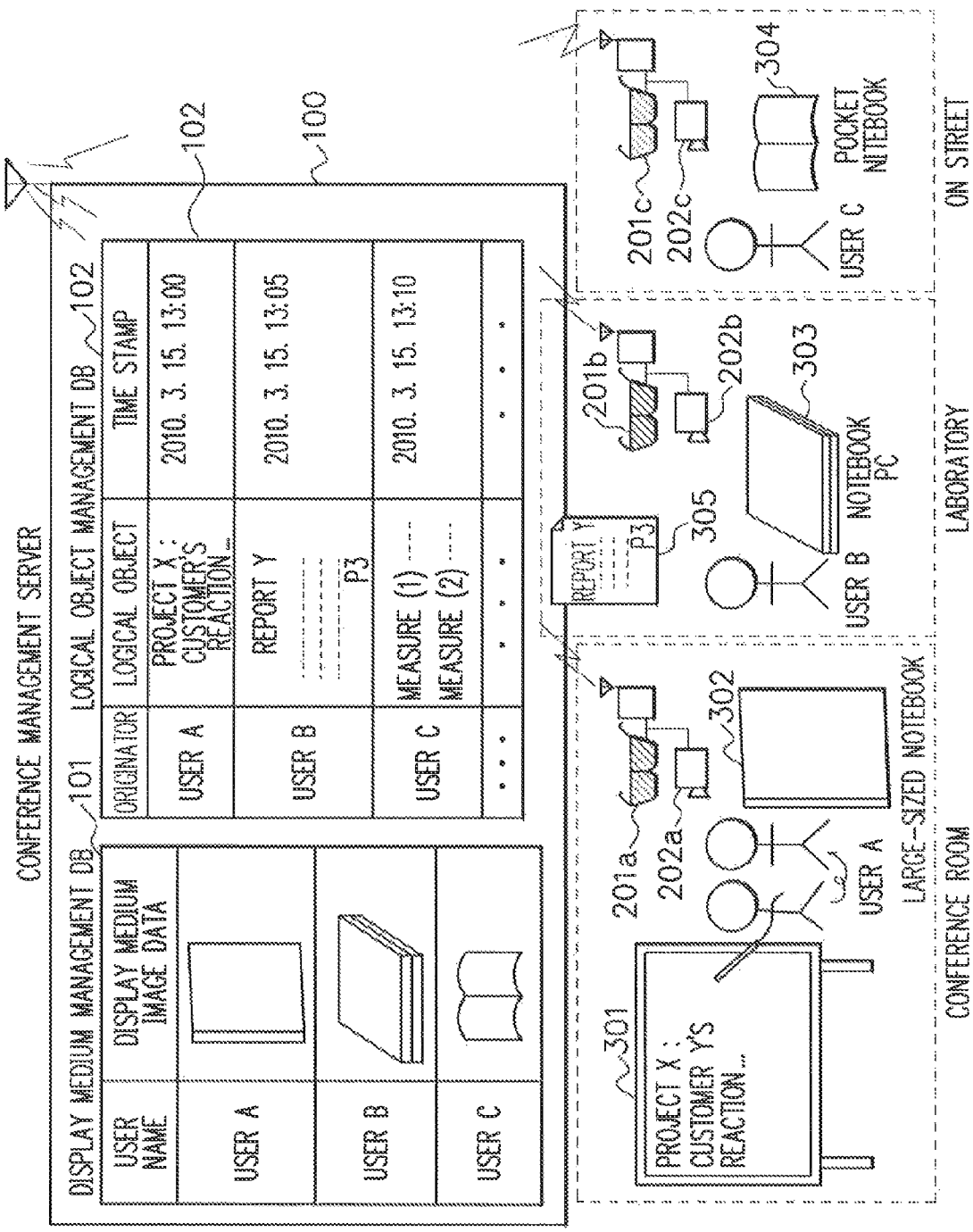
FIG. 1 is a diagram schematically showing a configuration of a conference management system according to an embodiment of the present invention.

FIG. 1 is a diagram schematically showing a configuration of a conference management system according to an embodiment of the present invention. As shown in FIG. 1, in the conference management system according to this embodiment, a conference management server 100, compact cameras 202a to 202c and HMDs (head mounted displays) 201a to 201c are connected to each other via a wireless communication line. The conference management server 100 includes a display medium management database 103 that manages display media of respective users, and a logical object management database 102 that manages a logical object to be displayed in a manner combined with an image of each display medium in a real space. The logical object refers to computer graphics image data containing information shared by the users. The logical objects may be objects containing diagrams, symbols, characters and the like represented by a trajectory of a detected writing operation by the user, and the computer graphics image data containing images taken by the compact cameras 202a to 202c. The HMDs 201a to 201c are an eyeglass type display and are configured to be worn on the heads of respective users A to C. The HMDs 201a to 201c display the logical object at a position in conformity with the image of the real space optically passing and being taken through the lenses of the HMDs 201a to 201c, thereby simulating augmented reality. The following description sometimes refers to the combined display of the logical object thus providing augmented reality, as AR (augmented reality) display. The compact cameras 202a to 202c are attached to the HMDs 201a to 201c so as to be capable of taking image data at the angles of view substantially equivalent to the fields of view of the respective users A to C. The taken image data is transmitted to the conference management server 100 via the wireless communication line. There are various types of HMDs, for instance, non-transmissive, video transmissive, and optically transmissive. The combined display (AR display) refers to computer graphics image data being superimposed at a position in conformity with the image of the real space seen through the lens of the HMD projected according to any of the above types. For instance, an optically transmissive HMD superimposes image data on the see-through image of the real space, and a video transmissive HMD superimposes image data on the image of the real space taken by a video camera.

Users A to C select a display medium to be used in the conference before attending the conference. The display medium refers to an object existing in the real space on which AR display of the logical object is to be performed. Here, user A selects the cover of a large-sized notebook 302 as the display medium. User B selects the cover of a notebook PC 303 as the display medium. User C selects two facing pages of a pocket notebook 304 as the display medium. The display medium preferably has a flat shape. However, the shape is not limited to a certain shape. Objects having any shape can be selected. After selecting the display medium, users A to C take images of display media 302 to 304 using the compact cameras 202a to 202c and perform an operation for registering the image data of the display media 302 to 304 in the conference management server 100. Accordingly, the image data of the display media 302 to 304 is transmitted to the conference management server 100. The conference management server 100 associates the image data of the display media 302 to 304 with the respective user names A to C, and manages the associated data in the display medium management database 101. User names A to C are acquired from the header information of the image data of the display media 302 to 304.

When users A to C attend the conference thereafter, the users capture the display media 302 to 304 selected by themselves in the angles of view of the compact cameras 202a to 202c. The image data of the display media 302 to 304 is thus transmitted to the conference management server 100. The conference management server 100 acquires the user name from the header information of the received image data, and determines whether or not an association between the received image data and the user name acquired from the header information of the image data is managed in the display medium management database 101. If the association between the received image data and the user name acquired from the header information of the image data is managed, verification of the display medium for the user is successful. If the verification of the display medium for the user is successful, the conference management server 100 transmits the logical object managed in the logical object management database 102 to the HMD of the user. The HMD receives the logical object from the conference management server 100, combines the computer graphics image data of the received logical object with the image of the display medium in the real space, and performs AR display.

This embodiment exemplifies the eyeglass type HMDs 201a to 201c as an example of an AR display device for performing AR display. However, the type is not limited thereto. For instance, the device may be an AR display device of a mobile terminal type that displays an image in the real space taken by a camera on a liquid crystal display or the like, combines computer graphics image data with the displayed image in the real space and displays the combined image. Alternatively, the device may be an AR display device of a head up display type that is installed in the direction of sight at the driver's seat of a mobile vehicle, combines an image in real space having optically passed with the computer graphics image data, and displays the combined image. For displaying the computer graphics image data in conformity with the image in the real space, the coordinates of the object in the image in the real space and the coordinates of the computer graphics image data are matched with each other. The position of the object in the real space is detected by analyzing the image data in the real space taken by the camera, and the computer graphics image data is synthesized so as to conform to the detected position. Particularly, in this embodiment, the coordinates are matched so as to superimpose the logical object on the image of the display medium in the real space. Another coordinate matching method may be adopted. This method includes adding a marker to the object in the real space, taking an image of the marker by the camera, detecting the position of the marker from the taken image data, and synthesizing the computer graphics image data so as to conform to the detected position. Alternatively, it may be estimated at which position in real space the user wearing the HMD looks based on the position (latitude and longitude) and the attitude (direction and angle of elevation) of the HMD, and the computer graphics image data may be synthesized so as to conform to the estimated position.

Incidentally, the logical object indicating the content of discussion is generated by the HMDs 201a to 201c and the compact cameras 202a to 202c of users A to C as the conference progresses. Every time the logical object is generated, the logical object is transmitted to the conference management server 100. When the conference management server 100 receives the logical object, this server manages the user name, which is the name of the originator of the logical object, and the time stamp representing the date and time of generation of the logical object in association with the logical object in the logical object database 102. The user name can be acquired from the header information of the transmitted data when the logical object is transmitted. The time stamp may be the date and time of creation of the transmitted data, which are acquired from the header information of the transmitted data. The time stamp may be the date and time of reception of the transmitted data.

As described above, when the verification of the display medium for the user is successful, the conference management server 100 transmits the logical object managed by the logical object management database 102 to the HMD 201a to 201c of the user. The logical object is transmitted when the logical object is registered in the logical object management database 102. Accordingly, the realtime experience of the conference can be maintained.

Figure 2:
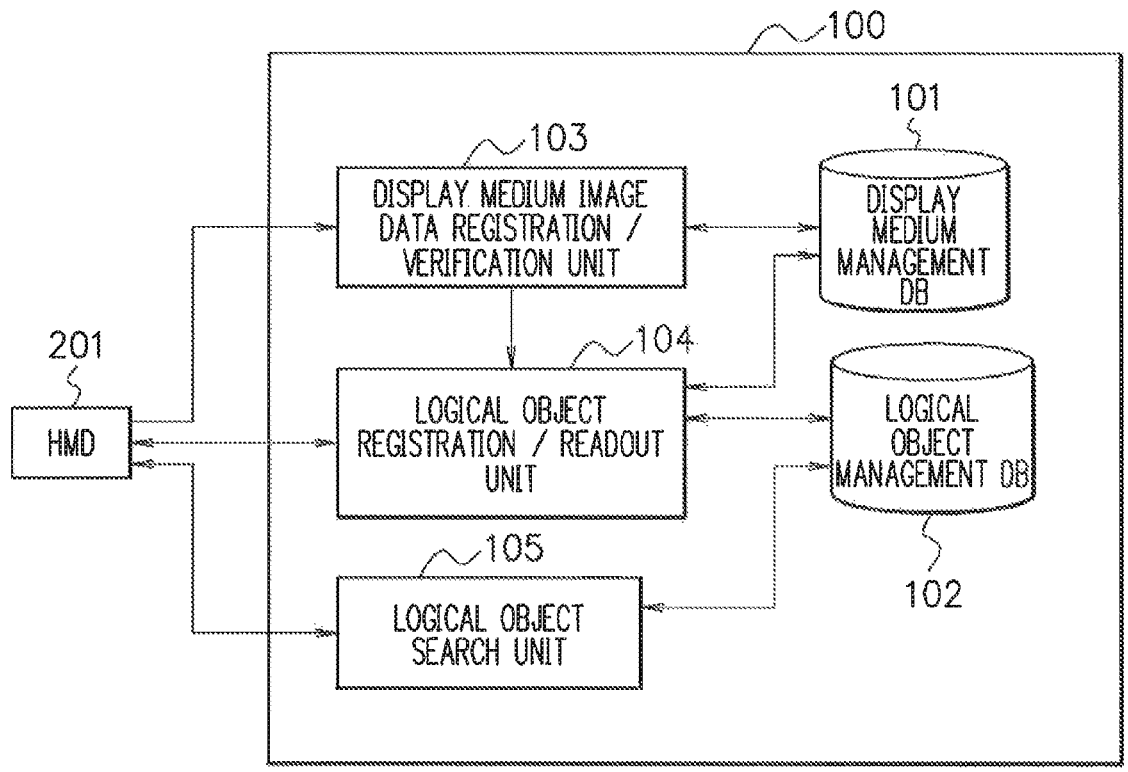
FIG. 2 is a diagram showing a functional configuration of a conference management server.

FIG. 2 is a diagram showing a functional configuration of the conference management server 100. In FIG. 2, on registration of the display medium before the conference, a display medium image data registration/verification unit 103 receives the image data of the display media taken by the compact cameras 202a to 202c, and registers the received data in association with the user name, in the display medium management database 101. In verifying the display medium on the conference, likewise, the display medium image data registration/verification unit 103 receives the image data of the display media taken by the compact cameras 202a to 202c, and verifies the display media by determining whether or not the association between the image data and the user names recorded in the header information of the image data is managed by the display medium management database 101.

When a logical object registration/readout unit 104 receives the logical objects from the HMDs 201a to 201c of the users, this unit 104 registers the received logical objects in the logical object management database 102. When the display medium image data registration/verification unit 103 verifies the display media 302 to 304, the logical object registration/readout unit 104 reads out the logical object from the logical object management database 102 and transmits the logical object to the HMDs 201a to 201c of the users on which the verification of the display media is successful. When a logical object search unit 105 receives a search condition from a PC or a mobile terminal (not shown), this unit 105 searches the logical object management database 102 for the logical object matching the search condition. For instance, if a date and time is designated in the search condition, a search is performed for the logical object having a time stamp matching the designated date and time. If an originator is designated in the search condition, a search is performed for the logical object of the designated originator. The logical object search unit 105 transmits the retrieved logical object to the PC or the mobile terminal having issued the search condition. This function can be used as conference minutes for retrieving required logical objects and reviewing the details of the conference thereafter.

Figure 3:
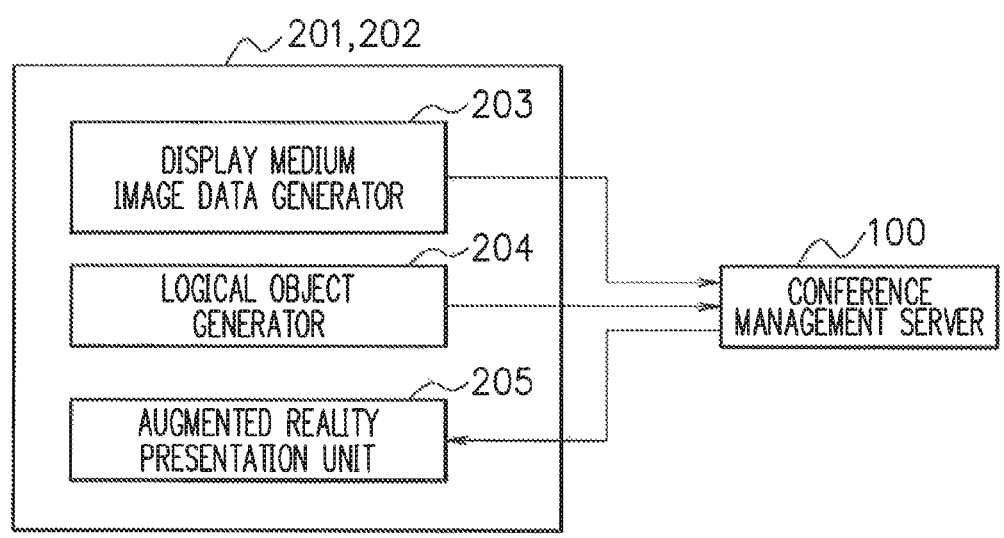
FIG. 3 is a diagram showing a functional configuration of an HMD and a compact camera.

FIG. 3 is a diagram showing a functional configuration of the HMD 201a to 201c and the compact cameras 202a to 202c. In FIG. 3, a display medium image data generator 203 has a configuration corresponding to the compact cameras 202a to 202c, and generates the image data of the display medium by imaging and transmits the image data to the conference management server 100. The logical object generator 204 has a configuration corresponding to the HMDs 201a to 201c and the compact cameras 202a to 202c. The generator 204 images writing operations of the users by the compact cameras 202a to 202c, detects the trajectory of the writing operation from the taken image data, and generates the logical object containing a diagram, a symbol, a character or the like corresponding to the detected trajectory. Further, the generator 204 generates a logical object containing the still image data or moving image data taken by the imaging process by the compact cameras 202a to 202c, and moreover, converts the content of a statement of the user into character data by applying speech analysis to the statement to thereby generate the logical object containing the converted character data. The logical object generator 204 transmits the generated logical object to the conference management server 100. An augmented reality presentation unit 205 receives the logical object from the conference management server 100, combines the computer graphics image data of the received logical object with the image of the display medium in the real space, and performs AR display.

Figure 4:
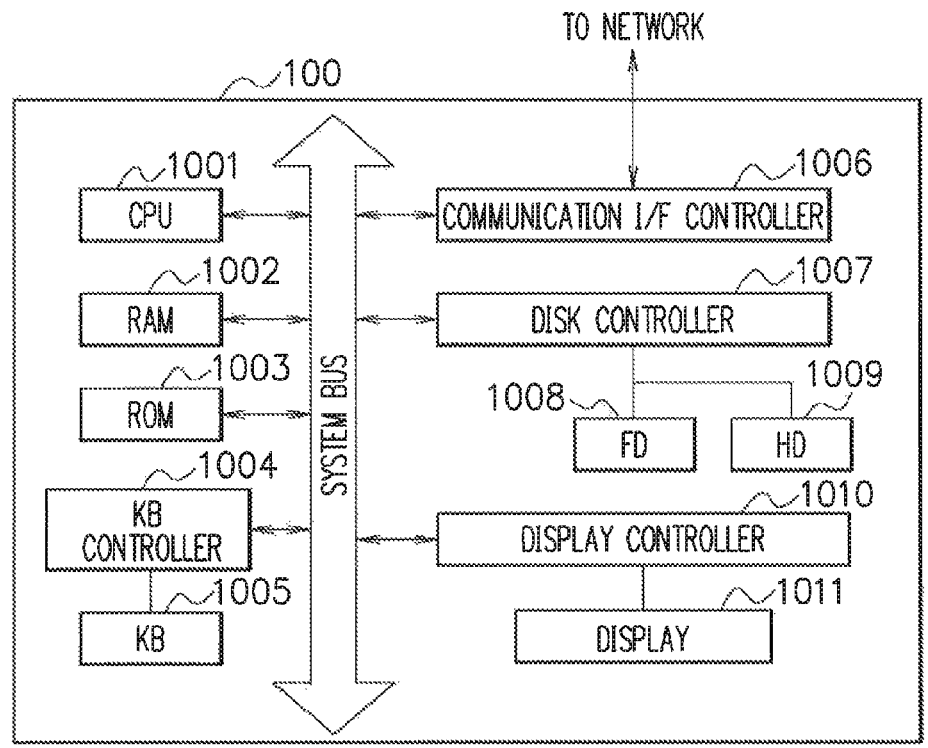
FIG. 4 is a diagram showing a hardware configuration of the conference management server.

FIG. 4 is a diagram showing a hardware configuration of the conference management server 100. A CPU 1001 integrally controls devices and controllers that are connected to a system bus. ROM 1003 or HD (hard disk) 1009 store a BIOS (basic input/output system) that is a control program for the CPU 1001, an operating system program, and programs and the like of processes shown in, e.g., FIGS. 6, 7A and 7B that are executed by the conference management server 100.

Figure 6:
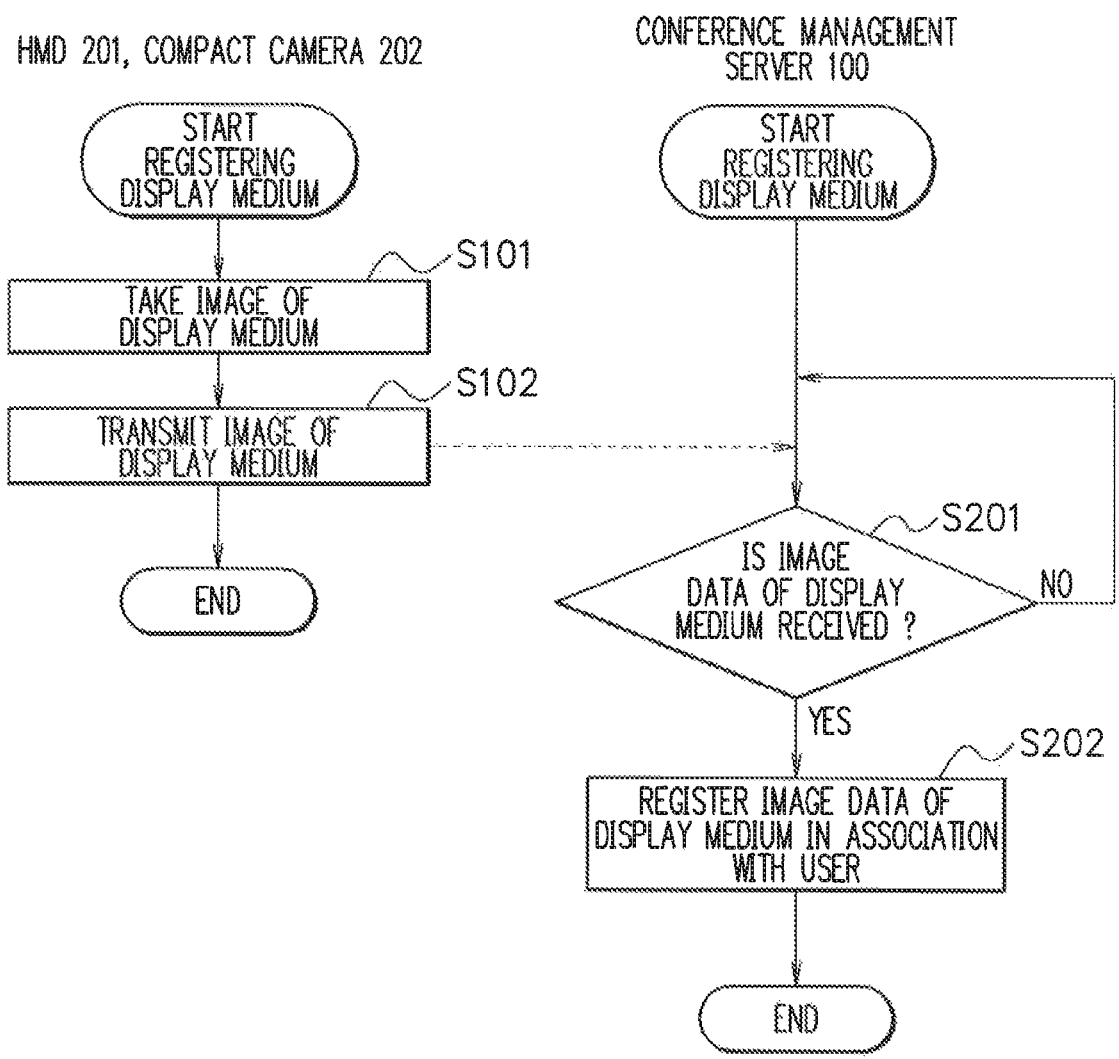
FIG. 6 is a flowchart showing a process of registering a display medium in the conference management system according to the embodiment of the present invention.
Figure 7B:
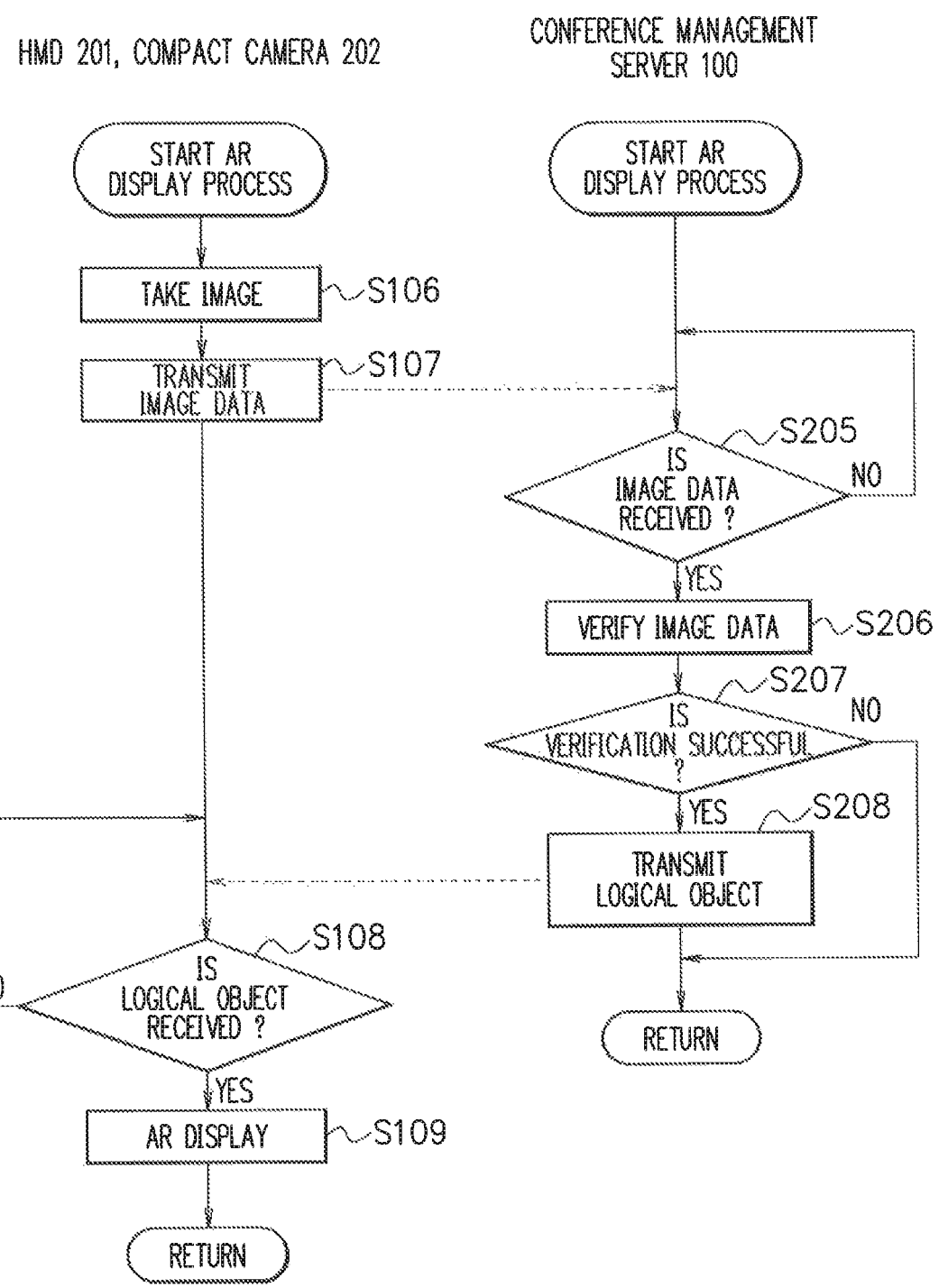
FIG. 7B is a flowchart showing a process of transmitting the logical object in the conference management system and displaying AR according to the embodiment of the present invention.

According to the example configuration in FIG. 4, the HD 1009 is stored in the conference management server 100. Another configuration may be adopted in which the configuration corresponding to the HD 1009 is arranged outside the conference management server 100. For instance, a configuration may be adopted in which the programs for executing the processes according to this embodiment shown in FIGS. 6, 7A and 7B are stored in a computer-readable recording medium, such as a flexible disk (FD) or a CD-ROM, and supplied from the recording media. Another configuration may be adopted in which the programs are supplied via a communication medium, such as the Internet.

RAM 1002 functions as a main memory, a work area and the like of the CPU 1001. The CPU 1001 loads programs and the like required to execute processes onto the RAM 1002 and execute the programs, thereby realizing various types of operations.

The HD 1009 and FD 1008 function as external memories. The CPU 1001 loads programs and the like required to execute processes onto the RAM 1002 and executes the programs, thereby realizing various types of operations.

A disk controller 1007 controls access to the external memories, such as the HD 1009 and the FD 1008. A communication I/F controller 1006 is connected to the Internet and a LAN, and controls communication to and from the outside using, for instance, TCP/IP.

A display controller 1010 controls display on a screen of a display 1011.

A KB controller 1004 accepts an operational input from a KB (keyboard) 1005, and transmits the input to the CPU 1001. Although not shown, in addition to the KB 1005, a pointing device, such as a mouse, is applicable to the conference management server 100 according to this embodiment, as user operation means.

The display medium image data registration/verification unit 103, the logical object registration/readout unit 104 and the logical object search unit 105 shown in FIG. 2 are the configuration realized by, for instance, the programs, which are stored in the HD 1009 and loaded onto the RAM 1002, as necessary, and the CPU 1001 executing the programs. The display medium management database 101 and the logical object management database 102 are the configuration corresponding to a part of storing areas of the HD 1009 and the RAM 1002.

Figure 5:
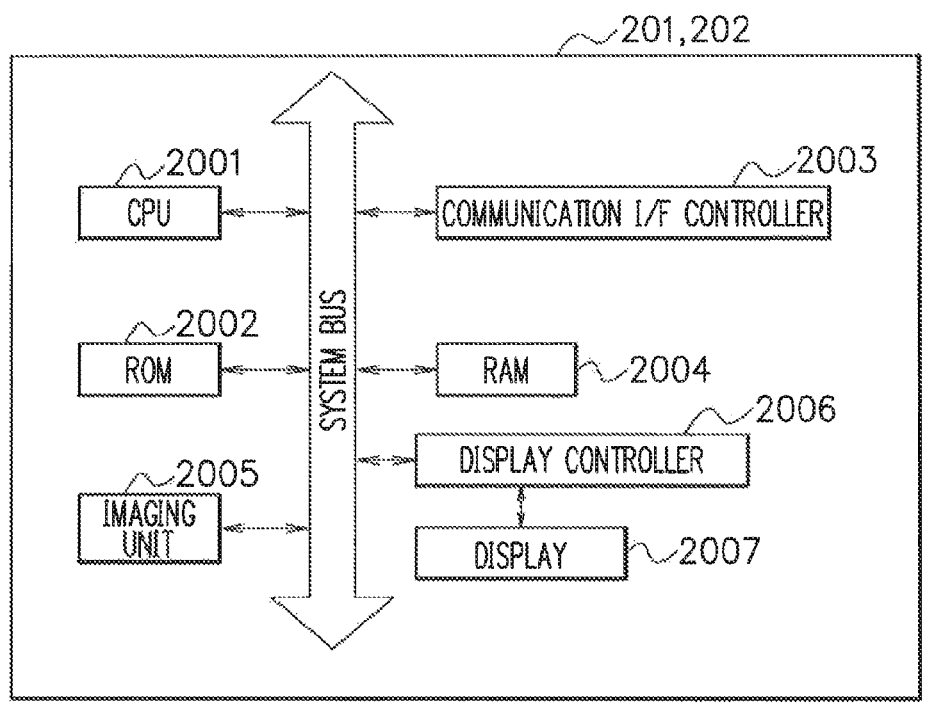
FIG. 5 is a diagram showing a hardware configuration of the HMD and the compact camera.

FIG. 5 is a diagram showing a hardware configuration of the HMDs 201a to 201c and the compact cameras 202a to 202c. A CPU 2001 integrally controls devices and controllers that are connected to a system bus. ROM 2002 stores programs and the like for executing the processes shown in FIGS. 6, 7A and 7B executed by the HMDs 201a to 201c and the compact cameras 202a to 202c, for instance. A configuration may be adopted in which the programs for executing the processes shown in FIGS. 6, 7A and 7B are supplied via a communication medium, such as the internet.

RAM 2004 functions as a main memory, a work memory and the like of the CPU 2001. The CPU 2001 loads programs and the like required to execute processes onto the RAM 2004 and executes the program, thereby realizing various types of operations. A communication I/F controller 2003 is connected to the Internet and a LAN, and controls communication to and from the outside using, for instance, TCP/IP.

An imaging unit 2005 converts a subject image, which is incident through an optical lens and formed on an imaging element, into an electric signal, and outputs moving image data or still image data. A display controller 2006 controls the display on a screen of a display 2007. This embodiment adopts an optically transmissive, display worn on a user's head. The display 2007 is configured using a half mirror. A user wearing the display can view an external scene via the display 2007. The augmented reality presentation unit 205 shown in FIG. 3 has a configuration realized by, for instance, a program loaded onto the RAM 2004 and the CPU 2001 executing the program. The logical object generator 204 has a configuration realized by the compact cameras 202a to 202c in FIG. 1 and a microphone (not shown) and, for instance, a program loaded onto the RAM 2004 and the CPU 2001 executing the program. The imaging unit 2005 has a configuration corresponding to the compact cameras 202a to 202c in FIG. 1 or a display medium image data generator 203 in FIG. 2.

FIG. 6 is a flowchart showing a process of registering a display medium in the conference management system according to this embodiment. Hereinafter, referring to FIG. 6, the process of registering the display medium in the conference management system according to this embodiment will be described.

First, aspects relating to the HMDs 201a to 201c and the compact cameras 202a to 202c are described. In step S101, the display medium image data generator 203 generates image data of a display medium selected by a user, by means of imaging. In step S102, the display medium image data generator 203 transmits the generated image data of the display medium to the conference management server 100.

Next, aspects relating to the conference management server 100 are described. In step S201, the display medium image data registration/verification unit 103 determines whether the image data of the display medium is received or not. If the image data of the display medium is received, the processing proceeds to step S202. On the other hand, if the image data of the display medium is not received, the display medium image data registration/verification unit 103 waits until receiving the image data of the display medium. In step S202, the display medium image data registration/verification unit 103 associates the image data of the display medium and the user name with each other and registers the associated data in the display medium management database 101.

FIG. 7A is a flowchart showing a process of registering the logical object in the conference management system according to this embodiment. Hereinafter, referring to FIG. 7A, the process of registering the logical object in the conference management system according to this embodiment will be described. Here, the process of registering the logical object generated according to the trajectory of the writing operation by the user is described.

First, aspects relating to the HMDs 201a to 201c and the compact cameras 202a to 202c are described. In step S103, the logical object generator 204 images the writing operation by the user. In step S104, the logical object generator 204 detects the trajectory of the writing operation from the taken image data. In step S105, the logical object generator 204 generates a logical object including diagrams, symbols, characters and the like that correspond to the trajectory of the detected writing operation, and transmits the generated object to the conference management server 100. In the writing operation, it is not necessary that the user actually writes the diagrams, symbols, characters and the like. The operation may be a simulated operation. Even with the simulated writing operation, the trajectory of the writing operation can be detected by analyzing the image data, and the logical object including the diagrams and the like corresponding to the trajectory can be generated.

Next, aspects relating to the conference management server 100 are described. In step S203, the logical object registration/readout unit 104 determines whether the logical object is received or not. If the logical object is received, the processing proceeds to step S204. On the other hand, if the logical object is not received, the logical object registration/readout unit 104 waits until receiving the logical object. In step S204, the logical object registration/readout unit 104 associates the logical object with the originator information and the time stamp of the logical object, and registers the associated object in the logical object management database 102.

FIG. 7B is a flowchart showing a process of transmitting the logical object and an AR display process in the conference management system according to this embodiment. Hereinafter, referring to FIG. 7B, the AR display process in the conference management system according to this embodiment will be described.

First, aspects relating to the HMDs 201a to 201c and the compact cameras 202a to 202c are described. In step S106, the display medium image data generator 203 generates an image data of a display medium by means of imaging. In step S107, the display medium image data generator 203 transmits the generated image data of the display medium to the conference management server 100.

Next, aspects relating to the conference management server 100 are described. In step S205, the display medium image data registration/verification unit 103 determines whether the image data of the display medium is received or not. If the image data of the display medium is received, the processing proceeds to step S206. On the other hand, if the image data of the display medium is not received, the unit 103 waits until receiving the image data. In step S206, the display medium image data registration/verification unit 103 verifies the display medium by determining whether the association between the image data of the received image data of the display medium and the user name recorded in the header information of the image data is managed in the display medium management database 101 or not. This verification process thus determines matching between the image data of the received display medium and the image data of the display medium registered in the display medium management database 101. This verification may be performed by pattern matching of the image data or the like. If the verification is successful, the processing proceeds to step S208. On the other hand, if the verification fails, the processing returns to step S205. In step S208, the display medium image data registration/verification unit 103 transmits the logical object to the HMD of the user having the user name associated with the image data of the display medium in the display medium management database 101.

Aspects relating to the HMDs 201a to 201c and the compact cameras 202a to 202c are described again. In step S108, the augmented reality presentation unit 205 determines whether the logical object is received or not. If the logical object is received, the processing proceeds to step S109. On the other hand, if the logical object is not received, the unit 205 waits until receiving the logical object. In step S109, the augmented reality presentation unit 205 combines the computer graphics image data of the received logical object with the image of the display medium in the real space, and performs AR display.

Next, referring to FIG. 1, a specific example of a conference held using the conference management system according to this embodiment will be described.

Before attending the conference, user A selects the cover of the large-sized notebook 302 as the display medium, user B selects the cover of the notebook PC 303 as the display medium, and user C selects the two facing pages of the pocket notebook 304 as the display medium. Users A to C take images of the cover of the large-sized notebook 302, the cover of the notebook PC 303, and the two facing pages of the pocket notebook 304 using the compact cameras 202a to 202c, and perform operations for registering the images as the respective display media. Accordingly, the image data of the cover of the large-sized notebook 302 is transmitted from the compact camera 202a of user A to the conference management server 100. The image data of the cover of the notebook PC 303 is transmitted from the compact camera 202b of user B to the conference management server 100. The image data of the two facing pages of the pocket notebook 304 is transmitted from the compact camera 202c of user C to the conference management server 100. The conference management server 100 associates user A and the image data of the cover of the large-sized notebook 302 with each other and manages the association, associates user B and the image data of the cover of the notebook PC 303 with each other and manages the association, and associates user C and the image data of the two facing pages of the pocket notebook 304 with each other and manages the association, in the display medium management database 101.

On attending the conference, users A to C take the images of the previously registered display media by the respective compact cameras 202a to 202c again. The taken image data is transmitted to the conference management server 100. The display media of users A to C are verified. If the verification is successful, users A to C become a state capable of attending the conference. First, user A writes a customer's reaction on a visit in the morning on the white board 301 in the conference room, and images the writing by the compact camera 202a. The HMD 201a and the compact camera 202a generate the logical object including the image data of the writing, and transmit the generated object to the conference management server 100.

Figure 8A:
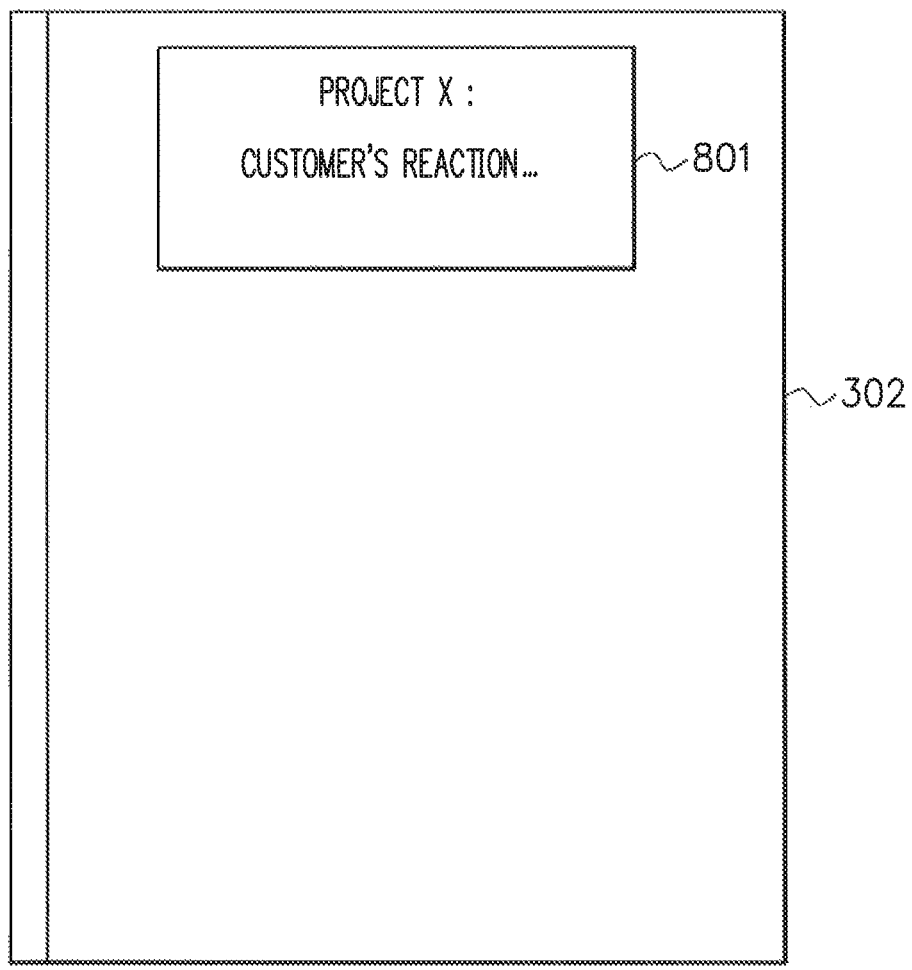
FIG. 8A is a diagram showing an example of AR display of the logical object on a display medium.

The conference management server 100 receives the logical object, associates the logical object with the originator (here, user A) and the time stamp, and registers the associated object in the logical object management database 102, and transmits the logical object to the HMDs 201a to 201c of users A to C. On the basis thereof, the HMDs 201a to 201c combine the logical object including the image data of the writing by user A with the respective images of the display media 302 to 304 to synthesize the logical object, and perform AR display. This allows users A to C to confirm the writing by user A on the respective display media 302 to 304. FIG. 8A shows a state where AR display of the logical object 801 including the writing by user A is performed on the display medium 302. This AR display of the logical object 801 on the display medium 302 allows user A to refer to the writing, having written on the white board 301 by user A, on the cover of the large-sized notebook as the display medium 302.

Next, user B considers that presentation of a research report written by user B attracts the customer, and images the corresponding page in the research report by the compact camera 202b. On the basis thereof, the HMD 201b and the compact camera 202b generate the logical object including the image data of the corresponding page, and transmit the generated logical object to the conference management server 100. The conference management server 100 receives the logical object, associates the logical object with the originator (here, user B) and the time stamp, and registers the associated object in the logical object management database 102. The conference management server 100 registers the logical object in the logical object management database 102, and transmits the logical object to the HMDs 201a to 201c. On the basis thereof, the HMDs 201a to 201c perform AR display of the logical object including the image data of the corresponding page of the research report on the respective images of the display media 302 to 304. This allows users A to C to confirm the corresponding page in the research report on the respective display media 302 to 304. FIG. 8B shows a state of AR display of the logical object 802 including the image data of the corresponding page of the research report on the image of the display medium 302. This AR display of the logical object 802 on the display medium 302 allows user A to refer to the corresponding page of the research report presented by user B on the cover of the large-sized notebook.

Figure 8C:
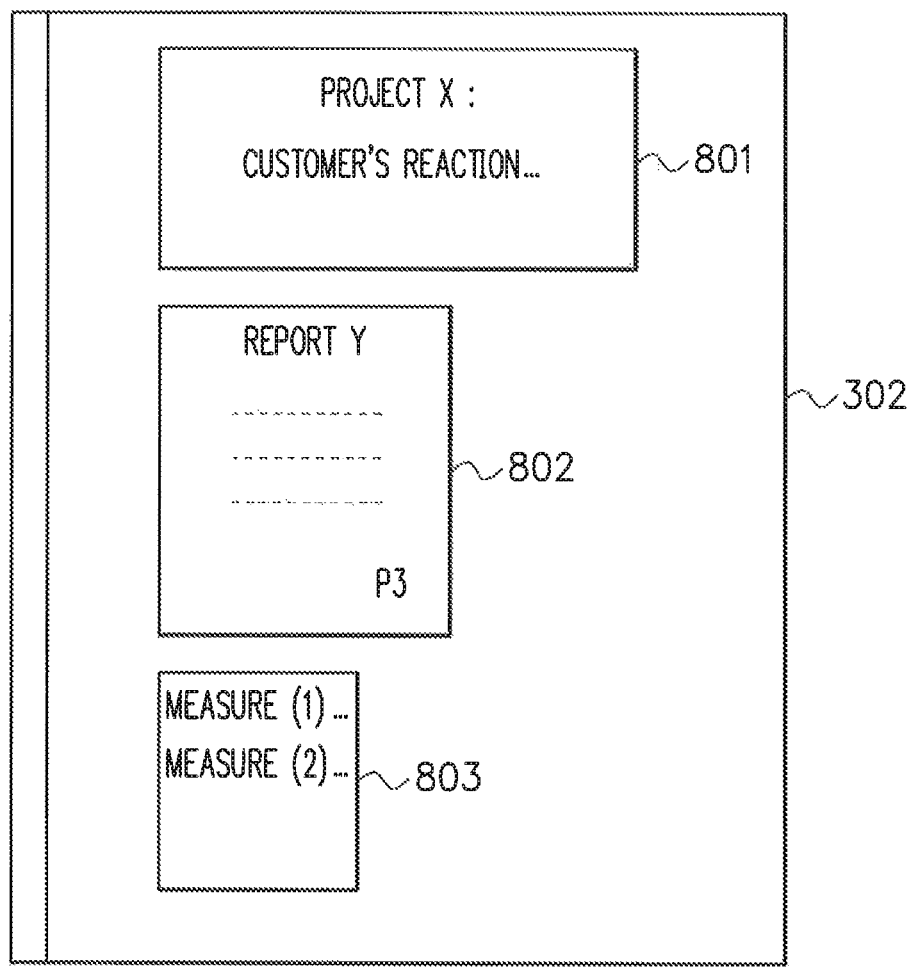
FIG. 8C is a diagram showing an example of AR display of logical objects on the display medium.

Next, user C writes some measures for customers in consideration of the content of the corresponding page, onto the two facing pages of the pocket notebook. This writing operation is imaged by the compact camera 202c, and the trajectory of the writing operation is detected, thereby generating a logical object including diagrams, symbols, characters and the like that correspond to the trajectory of the writing operation. The generated logical object is transmitted to the conference management server 100. The conference management server 100 receives the logical object, associates the logical object with the originator (here, user C) and the time stamp, and registers the associated logical object in the logical object management database 102, and transmits the logical object to the HMDs 201a to 201c. On the basis thereof, the HMDs 201a to 201c perform AR display of the logical object including the measures for customers written by user C, on the respective images of the display media 302 to 304. This allows users A to C to verify the measures for customers written by user C, on the respective display media 302 to 304. FIG. 8C shows a state of AR display of the logical object 803 including the measures for customers on the image of the display medium 302. This AR display of the logical object 803 on the display medium 302 further allows user A to refer to the measures written by user C, on the cover of the large-sized notebook.

FIGS. 8A to 8C exemplify the AR display on the cover of the large-sized notebook as the display medium 302 of user A. However, AR display of analogous logical objects is also performed on the cover of the notebook PC and the two facing pages of the pocket notebook, which are the display media 303 and 304 of user B and user C. This embodiment can thus provide support for a smooth conference without the environmental constraint due to the locations where participants are attending the conference, even if the participants are at physically different places. "Physically different places" include, as a concept, distant circumstances where participants are located in different locations, such as Tokyo and America, where participants share the same planar position (x-coordinate, y-coordinate) but are located at different heights (z coordinate), as with third and fourth floors of the same building, and closer circumstances, such as when participants are in opposite seats.

Figure 9:
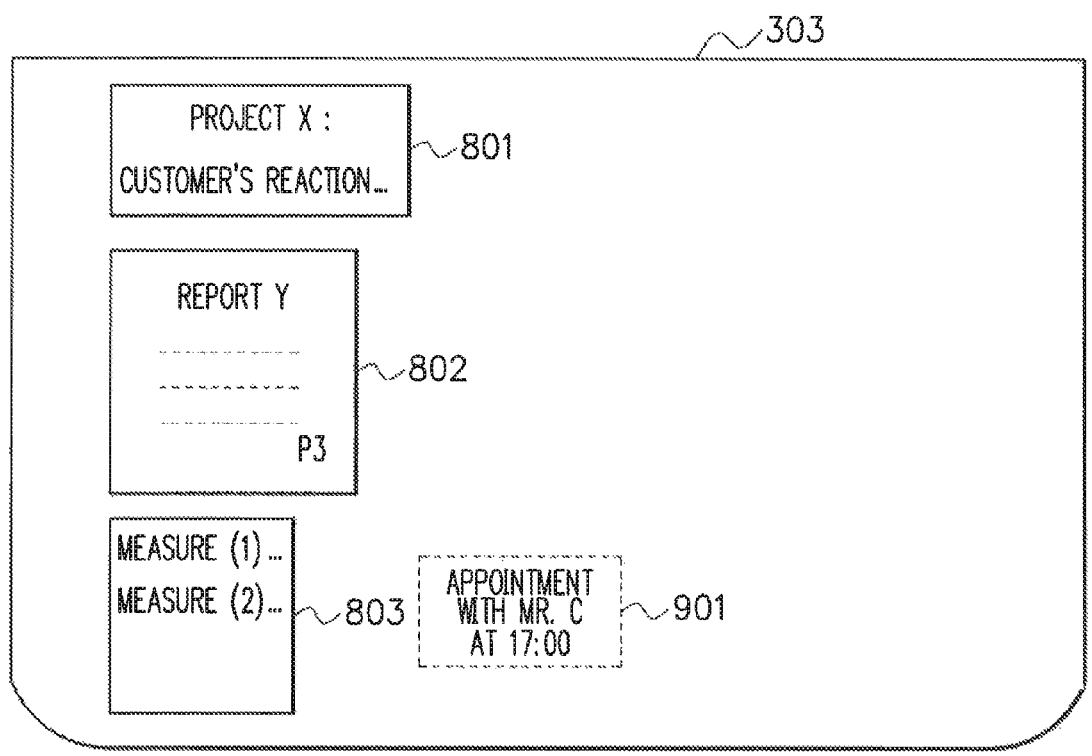
FIG. 9 is a diagram showing an example of AR display of logical objects on the display medium.

FIG. 9 shows an example of AR display on the display medium 303 of user B. In FIG. 9, reference numeral 901 denotes a logical object including the content written by user B. This logical object is different from the other logical objects, and is subject to AR display on the display medium 303 of user B, but is not subject to AR display on the other display media 302 and 304. More specifically, if the content written in the logical object 901 is a memorandum for user B, and user B does not want users A and C to view the content, user B sets a secret mode and subsequently creates the logical object 901. Thus, the process until the logical object 901 is transmitted to the conference management server 100 and managed by the logical object management database 102 is analogous to the above-described case. However, the logical object 901 is transmitted only to the HMD 201b of user B. The logical object 901 is not transmitted to the HMDs 201a and 201c of users A and C. Accordingly, the HMDs 201a and 201c of users A and C perform AR display without logical object 901. On the other hand, the HMD 201b of user B performs AR display with logical object 901.

FIG. 10 is a diagram showing an example of AR display on the display medium 302 of user A. The example of AR display shown in FIG. 10 is an example of a display mode adopted for AR display of many logical objects on a single display medium. In this diagram, the logical objects generated by the users are subjected to AR display separately for each user. In this example of AR display, the AR display is performed in a tab system on which the user names are described. Indication of a desired user name by a pen or the like allows the list of the logical objects generated by the user to be displayed in the foreground for viewing. In the example in FIG. 10, the logical objects 801 and 1100 generated by user A are AR-displayed in the foreground. Adoption of such a display mode enables the logical objects of each user to be presented for viewing in an organized manner even when the number of logical objects during the conference. It is a matter of course that the method of organizing the objects on AR display may be a mode of AR display in a tab system for each logical object, instead of the mode according to each user.

The logical object referred to by the speaking user may forcedly be placed in AR display in the foreground on the display medium for each conference participant. An identification can be made as to which user is speaking by the conference management server 100 monitoring audio signals acquired from microphones of the respective users. It can be realized by the conference management server 100 instructing the HMDs 201a to 201c of the respective users to perform AR display such that the logical object of the user identified as the speaker comes to the foreground. This supports understanding between the conference participants, thereby facilitating the conference.

In the AR display, the logical object may be scaled up or down to conform to the size of the display medium, and/or the logical object is displayed in a scroll system. This allows taking measures against even change in a working environment or change in posture, and resultant necessity to change the display medium.

In the case of the conference with AR display of the logical object containing pages of documents on the display media, the conference management server 100 may manage the position to which the speaker is referring and instruct the users' HMDs 201a to 201c to forcedly perform AR display thereof. For instance, it is assumed that, when user A is speaking indicating the fifth line on the tenth page of the document containing a total of 20 pages, user B is turning the 15th page of the document on AR display for browsing. In such a case, for instance, a bookmark type tag can be displayed at the fifth line on the tenth page of the document on the display medium for user B. This allows information on the reference position to be visually acquired even though the conference is held at physically distant places, and facilitates users following along in the document, thereby facilitating the conference.

In this embodiment, on AR display of the logical objects, the logical objects can be aligned in place. The position of the logical object subjected to the first AR display is regarded as the reference coordinates. Coordinates are acquired at the position where writing is made. The logical object containing the writing is disposed such that the positional coordinates become the same on the coordinate system on each display medium. This allows AR display where the positional relationship between the logical objects on the respective display media is organized in conformity. For instance, when user B performs writing to add a certain diagram b to a diagram a written by user A and subject to AR display on the display medium 303 of user B, an absence of appropriate positional alignment between logical objects on the display media deviates the positional relationship between the diagrams a and b on AR display on the display medium 303 of user B from the positional relationship between the diagrams a and b on AR display on the display media 302 and 304 of users A and C. In this embodiment, the aforementioned positional alignment between the logical objects executed by the HMDs 201a to 201c can prevent such a malfunction.

Examples of the conference management system according to this embodiment to one conference has been described above. However, the conference management system according to this embodiment is applicable to a plurality of conferences. With multiple conferences, the association between the user names and the image data of the display media, the logical objects and the like are managed in association with identification information of each conference. Accordingly, when a certain user registers the identical display medium in the conferences (e.g., the display medium management database 101 manages the association between user 1 and image data of a display medium 1 in association with two conferences, or conferences A and B), verification of the display medium (e.g., display medium 1) may cause the logical objects in the conferences (e.g., the logical object for the conference A and the logical object for the conference B) to be transmitted to the corresponding user, with identification information of each conference added to the objects, thereby performing AR display of the logical objects for the conferences on the identical display medium (e.g., display medium 1). In this case, for instance, the identification information of the conference added to each logical object can distinctly be displayed, thereby allowing easy understanding of which logical object belongs to which conference. The AR display is not necessarily performed such that the logical objects of the conferences are mixed on the identical display medium. Alternatively, the user may designate which conference he/she attends, before verification of the display medium, and notify the conference management server 100 of this designation. This allows only the logical object of the conference matching with the notification to be transmitted to the corresponding user, even if the display medium has been registered and verified on a plurality of conferences. Alternatively, an estimation can be made as to which conference the logical object belongs to, based on the time stamp, originator information or the combination thereof that is managed in association with the logical object.

The embodiment of the present invention can be implemented by a computer executing a program. Means for supplying the program to the computer, for instance, a computer-readable recording medium, such as a CD-ROM recording such a program, or a transmission medium for transmitting such a program is applicable to an embodiment of the present invention. A program product, such as a computer-readable recording medium recording the program, is applicable to an embodiment of the present invention. The present invention encompasses the program, the computer-readable recording medium, the transmission medium and the program product.

INDUSTRIAL APPLICABILITY

The present invention is useful for augmented reality capable of combining an image in real space with computer graphics image data and displaying the combined data in a superimposed manner.

The invention claimed is:

1. An information processing system comprising:
   a plurality of augmented reality presentation apparatuses including a transmissive display; and
   a conference management apparatus that is connected to the plurality of augmented reality presentation apparatuses via a network, wherein the conference management apparatus transmits and receives computer graphics image data,
   wherein the plurality of augmented reality presentation apparatuses each comprise:
      an imaging unit configured to take an image of a real space with which the computer graphics image data is displayed in a superimposed manner on the transmissive display;
      a display medium image data generation unit configured to transmit, to the conference management apparatus, image data of a display medium of the user using the augmented reality presentation apparatus, wherein the image data is received from the imaging unit; and
      a generation unit configured to generate presentation information for a conference using each of the augmented reality presentation apparatuses and to transmit the information to the conference management apparatus,
   wherein the conference management apparatus comprises:
      a display medium management unit configured to receive the image data of the display medium from the plurality of augmented reality presentation apparatuses and to associate the image data of the display medium with the user of the display medium, and registering the associated data in a recording medium,
      a management unit configured to receive the presentation information from the plurality of augmented reality presentation apparatuses, and
      a transmission unit configured to transmit the presentation information, received by the management unit, to each of the plurality of augmented reality presentation apparatuses that are connected to the conference management apparatus for use in the conference attended by the users registered in association with the image data of the display medium by the display medium management unit, and
   wherein each augmented reality presentation apparatus is further configured to display the computer graphics image data indicating the presentation information received from the conference management apparatus on the transmissive display in a superimposed manner so as to conform to the real space.

2. The information processing system according to claim 1, wherein the conference management apparatus further comprises:
   a verification unit configured to verify that image data of the display medium received from the plurality of augmented reality presentation apparatuses and the image data of the display medium registered by the display medium management unit, and
   wherein the transmission unit transmits the presentation information for the conference received by the management unit, to each of the plurality of augmented reality presentation apparatuses of the respective users registered in association with the image data of the display media by the display medium management unit, on the basis of a verification result by the verification unit.

3. The information processing system according to claim 1, wherein the generation unit detects a trajectory of a writing operation by the user, and generates information represented by the trajectory as the presentation information for the conference.

4. The information processing system according to claim 1, wherein the generation unit generates the image data acquired by an imaging process, as the presentation information for the conference.

5. The information processing system according to claim 1, wherein the generation unit analyzes a content of speech, converts the content of speech into character data, and generates the character data as the presentation information for the conference.

6. The information processing system according to claim 1, wherein the augmented reality presentation apparatus aligns positions between pieces of the presentation information received from the conference management apparatus with reference to positional coordinates of the presentation information presented first on the display as reference coordinates.

7. The information processing system according to claim 1, wherein the conference management apparatus further comprises:
   a retrieving unit configured to retrieve the presentation information for the conference on the basis of at least one of pieces of information indicating the user and a point of time of the generation of the presentation information that are managed by the management unit in association with the presentation information for the conference.

8. The information processing system according to claim 1, wherein, when a selection of a prescribed display mode is received from a user, the transmission unit transmits the presentation information about which the setting on the prescribed display mode is set, only to the augmented reality presentation apparatus of the user.

9. The information processing system according to claim 1, wherein the display presents the computer graphics image data indicating the presentation information in a separate manner for each user.

10. The information processing system according to claim 1, wherein the display scales the presentation information up or down so as to conform to a size of each display medium and presents the information or the presentation information using a scroll system.

11. An information processing system comprising:
    a plurality of augmented reality presentation apparatuses including a non-transmissive display; and
    a conference management apparatus that is connected to the plurality of augmented reality presentation apparatuses via a network, wherein the conference management apparatus transmits and receives computer graphics image data,
    wherein the plurality of augmented reality presentation apparatuses each comprise:
       an imaging unit configured to take an image of a real space with which the computer graphics image data is displayed in a superimposed manner on the nontransmissive display;
       a display medium image data generation unit configured to transmit, to the conference management apparatus, the image data of a display medium of the user using the augmented reality presentation apparatus, wherein the image is received from the imaging unit; and a generation unit for configured to generate presentation information for a conference of the user using the each augmented reality presentation apparatus and to transmit the information to the conference management apparatus, wherein the conference management apparatus comprises:

a display medium management unit configured to receive the image data of the display medium from the plurality of augmented reality presentation apparatuses and to associate the image data of the display medium with the user of the display medium, and registering the associated data in a recording medium, a management unit configured to receive the presentation information from the plurality of augmented reality presentation apparatuses, and a transmission unit configured to transmit the presentation information, received by the management unit, to all the plurality of augmented reality presentation apparatuses that are connected to the conference management apparatus for use in the conference attended by the users registered in association with the image data of the display medium by the display medium management unit, and wherein each augmented reality presentation apparatus is further configured to display the computer graphics image data indicating the presentation information received from the conference management apparatus on the nontransmissive display in a superimposed manner so as to conform to the image of the real space taken by the imaging unit.

12. The information processing system according to claim 11, wherein the conference management apparatus further comprises:

a verification unit configured to verify that image data of the display medium received from the plurality of augmented reality presentation apparatuses and the image data of the display medium registered by the display medium management unit, wherein the transmission unit transmits the presentation information for the conference received by the management unit, to each of the plurality of augmented reality presentation apparatuses of the respective users registered in association with the image data of the display media by the display medium management unit, on the basis of a result of the verification by the verification unit.

13. The information processing system according to claim 11, wherein the generation unit detects a trajectory of a writing operation by the user, and generates information represented by the trajectory as the presentation information for the conference.

14. The information processing system according to claim 11, wherein the generation unit generates the image data acquired by an imaging process, as the presentation information for the conference.

15. The information processing system according to claim 11, wherein the generation unit analyzes a content of speech, converts the content of speech into character data, and generates the character data as the presentation information for the conference.

16. The information processing system according to claim 11, wherein the augmented reality presentation apparatus aligns positions between pieces of the presentation information received from the conference management apparatus with reference to positional coordinates of the presentation information presented first on the display as reference coordinates.

17. The information processing system according to claim 11, wherein the conference management apparatus further comprises:

a retrieving unit configured to retrieve the presentation information for the conference on the basis of at least one of pieces of information indicating the user and a point of time of the generation of the presentation information that are managed by the management unit in association with the presentation information for the conference.

18. The information processing system according to claim 11, wherein, when a selection of a prescribed display mode is received from the user, the transmission unit transmits the presentation information about which the setting on the prescribed display mode is set, only to the augmented reality presentation apparatus of the user.

19. The information processing system according to claim 11, wherein the display presents the computer graphics image data indicating the presentation information in a separate manner for each user.

20. The information processing system according to claim 11, wherein the display scales the presentation information up or down so as to conform to a size of the display medium and presents the information or the presentation information in a scroll manner.

21. An information processing method executed by an information processing system comprising a plurality of augmented reality presentation apparatuses including a transmissive display, and a conference management apparatus that is connected to the plurality of augmented reality presentation apparatuses via a network, wherein the conference management apparatus transmits and receives computer graphics image data, the method comprising:

taking an image of a real space with which the computer graphics image data is displayed in a superimposed manner on the transmissive display;

transmitting the image data of a display medium of the user using each augmented reality presentation apparatus that has been taken by the imaging unit, to the conference management apparatus;

generating presentation information for a conference of the user using the each augmented reality presentation apparatus;

transmitting the information to the conference management apparatus;

receiving the image data of the display medium from the plurality of augmented reality presentation apparatuses;

associating the image data of the display medium with the user of the display medium;

registering the associated data in a recording medium;

receiving the presentation information from the plurality of augmented reality presentation apparatuses;

transmitting the received presentation information to each of the plurality of augmented reality presentation apparatuses that are connected to the conference management apparatus and used in the conference attended by the users registered in association with the image data of the display medium; and displaying, at each augmented reality presentation apparatus, the computer graphics image data indicating the presentation information received from the conference management apparatus on the transmissive display in a superimposed manner so as to conform to the real space.

22. An information processing method executed by an information processing system comprising a plurality of augmented reality presentation apparatuses including a nontransmissive display, and a conference management apparatus that is connected to the plurality of augmented reality presentation apparatuses via a network, wherein the conference management apparatus transmits and receives computer graphics image data, method comprising:

taking an image of a real space with which the computer graphics image data is displayed in a superimposed manner on the nontransmissive display;

transmitting the image data of the display medium of the user using each augmented reality presentation apparatus that has been taken by the imaging unit, to the conference management apparatus; and generating presentation information for a conference of the user using the each augmented reality presentation apparatus;

transmitting the information to the conference management apparatus;

receiving the image data of a display medium from the plurality of augmented reality presentation apparatuses;

associating the image data of the display medium with the user of the display medium;

registering the associated data in a recording medium, receiving the presentation information from the plurality of augmented reality presentation apparatuses, and transmitting the received presentation information to all the plurality of augmented reality presentation apparatuses that are connected to the conference management apparatus and used in the conference attended by the users registered in association with the image data of the display medium;

displaying the computer graphics image data indicating the presentation information received from the conference management apparatus on the nontransmissive display in a superimposed manner so as to conform to the image of the real space taken by the imaging unit.

* * * * *